Patented June 21, 1938

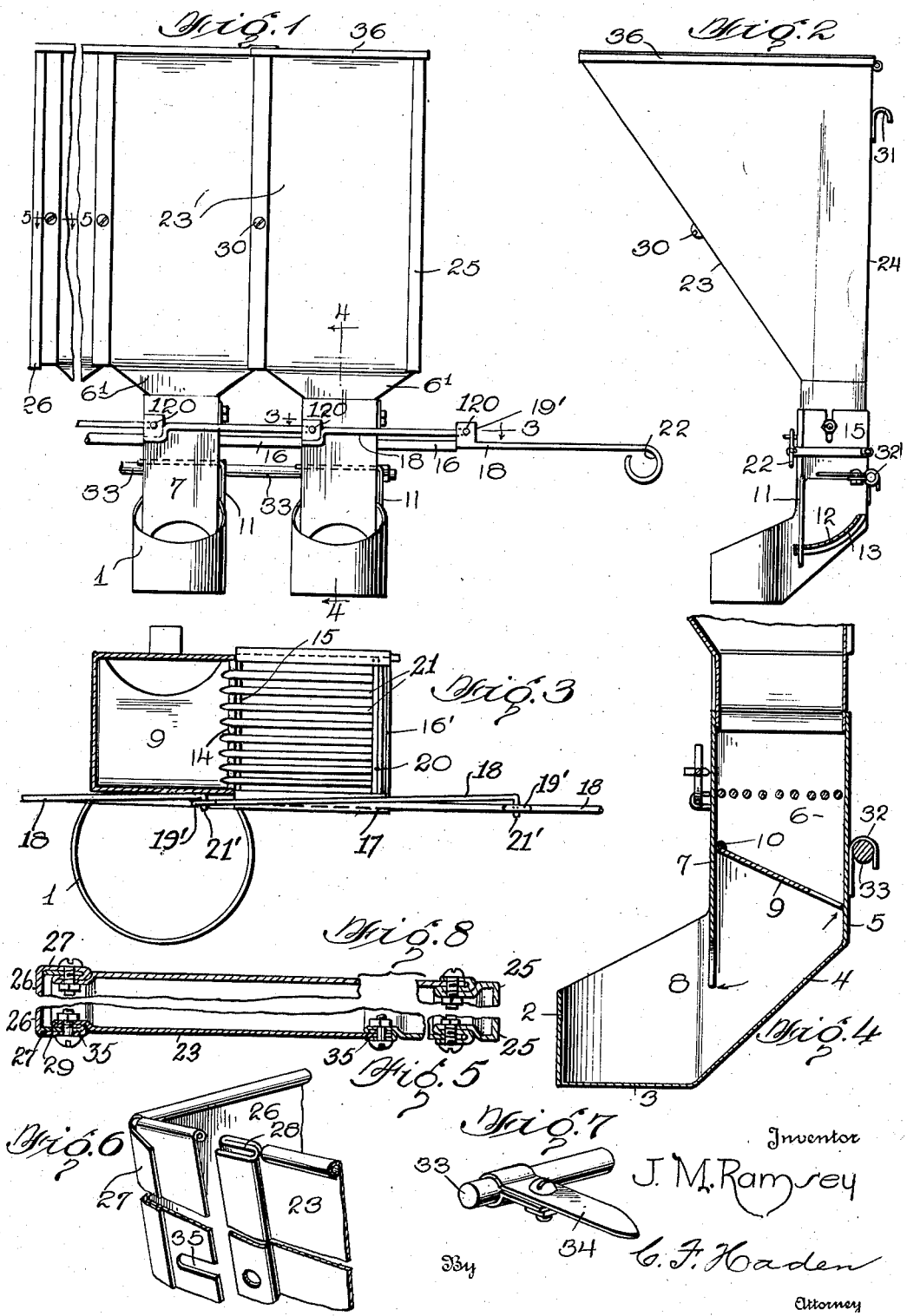

2,121,407

UNITED STATES PATENT OFFICE 2,121,407

ANIMAL FEEDER

Joseph M. Ramsey, Wilmar, Calif.

Application March 19, 1935, Serial No. 11,851

3 Claims. (Cl. 119—56)

This invention relates to animal feeders for delivering measured portions of chop feed, cut hay, clover, or other forage, constructed in separate and individual units, and more particularly to feeders employed by breeders, whereby as the number of animals increases feeding units may be added as needed to accommodate a greater number of animals, or as the number of animals decreases, by sale or otherwise, feeding units may be detached and removed.

It is my intention to build the feeding units in rights and lefts and in various styles and sizes and of any suitable material, preferably sheet metal, according to the needs of the particular class of animals with which it is employed.

The primary object is to be able to regulate, exactly, the amount of feed given to each animal at each feeding.

Another object is to regulate the number of feeders used according to the number of individual animals to be fed.

Another object is to reduce the average cost per unit as the number of units is increased.

Another object is to construct the feeder of such materials, preferably sheet metal, and in such a manner that they may be readily cleaned and completely sterilized in a minimum of time.

Another object is to be able to measure simultaneously the desired amount of feed available to the animals in each one of a battery of feeders by a single motion.

Another object is to so construct the units that they may be assembled or disassembled without any tool but a screw driver.

Other objects will appear as the description proceeds.

In general a feeding unit consists of three important subdivisions; a hopper, storage bin, or feed container; a chute to carry feed from the hopper; and a feeding trough, cup, or box to which the chute delivers the feed.

The hopper, bin, or container, has a rear wall, preferably vertical; side walls, preferably vertical; and a front wall, preferably flaring outwardly from the bottom to the top. The front edges of the side walls follow the flaring of the front wall. All walls are connected at their meeting edges, preferably detachably, and the upper edges of all walls lie in the same horizontal plane. The hopper, constructed as described, forms a funnel-shaped receptacle. To protect the contents of the hopper a lid of suitable dimensions is hinged to the top of one of the walls, preferably the rear wall.

When the feeder is used for poultry, it may be desirable to construct it so that the top slants downwardly from the back to the front to prevent the birds roosting upon the top. This, of course, merely requires a mechanical modification of the construction shown and described.

The chute is a continuation from the lower end of the hopper, to which it is connected, fixedly or detachably, as desired. A separating or dividing fork is provided which passes through the chute to divide the food therein into measured portions, and a hinged baffle is located in the chute at an appropriate point below the separating or dividing fork to limit the amount of each separated portion of feed cut off by the dividing fork from the general supply and to control the rate of flow of the feed to the feeding trough.

The feeding trough, cup or box is below the lower end of the chute and may be of any convenient form, preferably that form which proves by experience to be the most efficient and convenient in caring for the particular class of animals fed therefrom. Feed troughs may be made detachable, if desired, and of different sizes and shapes so that they may be used interchangeably, according to the requirements of the animals.

In the drawing accompanying and forming a part of this specification I have illustrated, by way of example, one form of my invention in which Figure 1 is a front elevation, with the forks slid into dividing position.

Fig. 2 is a side elevation, looking from the right of Fig. 1.

Fig. 3 is a sectional view, taken on the line 3—3 of Fig. 1, and looking in the direction indicated by the arrows at the ends of the line 3—3, showing the dividing fork fully withdrawn.

Fig. 4 is a sectional view, taken on the line 4—4 of Fig. 1, and looking in the direction indicated by the arrows at the ends of the line 4—4.

Fig. 5 is a horizontal sectional view of the front wall of the device, taken on a plane defined by the line 5—5 in Fig. 1 and looking downward.

Fig. 6 is a perspective detail view of the upper left hand corner of Fig. 1, showing the construction which provides for assembling and detaching the units from each other.

Fig. 7 shows a detail to be explained in the description.

Fig. 8 is a horizontal sectional view of the rear wall of the device, taken in the same plane as Fig. 5.

Trough or feeding box or cup (1), here shown substantially circular in plan, may be of any convenient shape, the front wall of which cup (2) is lower than other parts of its walls to accommodate smaller animals. From the bottom (3) of the trough there extends upwardly an inclined plane or slide (4) which merges into the rear wall (5) of a chute (6) substantially rectangular in cross-section, having rear, front, and side walls. The front wall (7) extends downwardly into the trough (1) slightly below the plane of the upper edge of the front wall (2) of the feeding trough or cup and has an upwardly curved cut-out (8) to permit more ready access to the feed as it slides down the feed slide (4).

A baffle (9) is swingingly located on a pintle (10) near the front wall 7 in the chute (6) above the lower edge of the front wall (7). Pintle (10) projects through both side walls of chute (6) and its right hand end is bent at right angles (11) and positioned to engage teeth (12) in an arc shaped rack (13) whereby the baffle (9) inside of chute (6) and fixed to pintle (10) is held in any position selected from fully open to fully closed and regulates or prevents the fall of feed through the chute to the feed trough. The free edge of baffle (9) is curvedly cut out similarly to the curved cut-out (8) in the front wall (7) of the chute, and for the same reason, and the two cut-outs are in registration when baffle (9) is fully open. On the right hand side of the chute there is an opening or slot 14 for the passage of the dividing fork and adjustably secured thereover is a slide-carrying plate (15). Plate (15) extends above and below slot (14) sufficiently to provide for the necessary adjustment of the slide, and in the upper portion of plate (15) there is a slot through which and through a hole in the wall of the chute a bolt is placed whereby the plate (15) is held in adjusted position. Fixedly attached to plate (15) and at right angles thereto is a dividing fork carrying plate 16, having its longitudinal edges bent upwardly and then inwardly as at 17 and 19 to overlie guiding rod 18 and its complementary guiding rod 20' and retain and guide the dividing fork in its reciprocations. The outer end of plate 16 is bent upwardly at right angles as at 16' to form an abutment which limits the withdrawal of dividing fork. The inner end of the dividing fork carrying-rod (18) slides under guide (17). A cross-bar (20) is fixed at right angles to and is carried by fork carrying-rod (18). Cross-bar (20) carries a plurality of spaced pointed fork tines 21 parallel to carrying rod (18). The free end of cross-bar (20) is bent at right angles and forms a second guide (20') slides under guide element (19) and complementary to the sliding guide formed by carrying-rod (18) located in guiding element (17). The fork tines are pointed so they will easily penetrate the feed in the chute. The upper end (6') of chute (6) is flared in hopper fashion and to this extension are connected the walls of the feed receptacle or storage bin. Each dividing fork operating rod (18) has a limiting lug 19' thereon to abut against plate (16) and prevent further inward travel. Each limiting lug 19' is provided with a perforation 120 into which the right angularly bent end 21' of the succeeding fork rod (18) resiliently snaps. Thus all the dividing forks may be operated simultaneously by manipulating the handle (22) of the first unit. The hopper, bin, or feed storage receptacle is composed of a front wall (23) a back wall (24) a right hand wall (25) and a left wall (26). The front wall (23) and the back wall (24) are, preferably, but not necessarily, integral with the front wall and the back wall, respectively, of chute (6), but side walls (25) and (26) are removably attached to the front wall (23) and the back wall (24). Side walls (25) and (26) are plane plates having right angularly bent flanges (27) to embrace the edges of front wall (23) and back wall (24). The left hand edges of front wall (23) and back wall (24) are folded back upon themselves and then bent reversely forward forming an open recess as at (28) into which the right hand end of the contiguous unit fits as at (29) and the two are clamped in assembled relation by an ordinary stove-bolt (30). On the back wall (24) of the hopper is a hook (31) and another hook (32) is placed on the back wall of chute (6). Hook (31) is for the purpose of holding the feeder against the wall of the house or coop in which the feeder is located. Hook (32) takes over a rod (33) of a length sufficient to extend transversely the full width of the entire assemblage of units. On rod (33) there are limiting stops (34) adjustably secured to rod (33) as shown in Fig. 7, which prevent the accidental separation of the assembled units, or any play between the different units when dividing fork operating rod (18) is manipulated.

I prefer to have open slots (35) in one of the detachable edges because they permit assembly and detachment without removing bolts (30) as would be necessary if both parts were provided with bolt-holes, only.

The use of the open slots 35 makes the use of rod (33) and its stops (34) particularly advisable to guard against accidental disengagement of the assembled units.

Hingedly attached to one wall of the hopper or bin is a cover (36) which is provided with one reversely bent attaching edge like that shown in Fig. 6, to provide for adding extensions of the lid or cover to protect the contents of added hoppers.

I have found that it is much cheaper to manufacture the side plate 26 with a narrow flange and fasten to it, by solder or otherwise, an extension made of scrap metal, as illustrated in Fig. 6. The extension is slid into the recess 28, and the slot 35 in its edge straddles the bolt 30 carried by the front wall.

I find that baffle (9) functions more satisfactorily with some kinds of feeding material when it is curved upwardly, that is: when it is somewhat cup shaped.

Feeders of this construction may be used, generally, for caring for various kinds of stock; but I invented it for and have used it with great success and satisfaction in raising rabbits, hares, and similar animals.

Having fully described my invention and the best method of practicing it now known to me I claim:

1. An animal feeder unit having a hopper comprising a front wall, a back wall and side walls; a chute and a feeding trough, the front and the back edges of the walls at one side of the feeder being provided with grooves, the edges of the front and the back walls at the other side of the feeder having tongues, a side wall having flanges to fit into the grooves, another side wall provided with grooves to fit over the tongues whereby other units of similar construction may be added to the original unit on either or on both sides by removing the side of the unit to which the new unit is to be added and assembling the new unit where the side of the original unit was removed and means for holding the plurality of units in assembled relation.

2. An animal feeding unit having a hopper comprising a front wall, a rear wall and side walls; a chute and a feeding trough, the edges of the front wall and the rear wall being provided with means for readily attaching and detaching units similarly constructed, the side walls having flanges provided with cooperating attaching means for engaging the attaching means of the front wall and the rear wall, whereby the sides may be readily removed and units similarly constructed may be added to provide for the simultaneous feeding of a plurality of animals.

3. In an animal feeder a hopper, a chute, a feed trough, a dividing fork, a fork guide on the side of the chute, the chute having an opening in its side in alinement with the guide for the passage of the fork, a pivoted baffle near the lower end of and within the chute for regulating the flow of the feed, the pivot of the baffle extending through a wall of the chute and being bent at right angles, a rack on the side of the chute to be engaged by the angular extension of the pivot, means to manipulate the dividing fork, and a lug on the dividing fork manipulating means to limit the distance of its travel, the lug having an opening into which may be engaged a fork manipulating device of a companion feeder of similar construction whereby the dividing forks of a plurality of feeders are operable simultaneously by a single motion.

JOSEPH M. RAMSEY.